United States Patent [19]
Henrion et al.

[11] 4,195,205
[45] Mar. 25, 1980

[54] SIGNAL TRANSFER SYSTEM FOR TIME DIVISION SWITCHING SYSTEMS

[75] Inventors: Michael Andre R. Henrion, Boulogne, France; Marcel A. van Brussel, Hoboken, Belgium

[73] Assignee: International Standard Electric Corporation, New York, N.Y.

[21] Appl. No.: 918,296

[22] Filed: Jun. 21, 1978

[51] Int. Cl.² ............................................. H04J 3/12
[52] U.S. Cl. .................................... 370/10; 179/7 R
[58] Field of Search ............. 179/15 BY, 15 AT, 7 R, 179/7.1 R

[56] References Cited

U.S. PATENT DOCUMENTS

| | | | |
|---|---|---|---|
| 3,394,230 | 7/1968 | Kinder | 179/15 BY |
| 3,549,814 | 12/1970 | Jaeger | 179/15 BY |
| 3,824,349 | 7/1974 | Buchner | 179/15 BY |
| 3,925,620 | 12/1975 | Eastrom | 179/15 BY |
| 3,984,642 | 10/1976 | Potter | 179/15 BY |

*Primary Examiner*—David L. Stewart
*Attorney, Agent, or Firm*—James B. Raden; Donald J. Lenkszus

[57] ABSTRACT

A signalling arrangement for use in PCM systems includes a transfer control for determining whether signalling between exchanges should be transmitted over a speech channel or a signalling channel. If signalling is directed to information for setting up a call, a speech channel is used, whereas supervisory information employs a signalling channel. A marking memory is used having a memory cell per speech channel. A bit is stored in each memory cell for transfer of call set-up information.

7 Claims, 5 Drawing Figures

SIGNAL TRANSFER SYSTEM FOR TIME DIVISION SWITCHING SYSTEMS

BACKGROUND OF THE INVENTION

1. Field of the Invention

This invention pertains in general to a signal transfer system for time division switching centers and in particular to a "line" signalling transfer system between at least one multiplex highway having access to a time division switching center including at least one multiregister provided in this center.

2. Description of the Prior Art

Setting up, holding and releasing of telephone calls, in particular, requires signal transmission between switching centers. In this respect, a distinction is usually made between "line" signalling which includes exchanges of signals generally concerning the state of the call or of the channels it uses between the centers and "register" signalling which includes exchanges of signals concerning the call destination (called subscriber number, class of call, etc. . . . ) and its routing situation (congestion, busy condition, free subscriber, etc. . . . ). This distinction is far from being general and depends on the telephone networks. It appears typically in networks using multifrequency signalling. Register signalling is exchanged as voice frequency signals during the call setting up period, line signalling concerns all the other signals exchanged during the whole time of the call.

Line signalling is usually exchanged between units permanently connected to the call channel, while register signalling requires complex units which are connected to the channel only on a temporary basis.

When a call uses a pulse code modulation (PCM) multiplex highway, line signalling is transmitted by a signalling channel, while the register signalling uses the speech channel.

The PCM highway of the 30 channel CEPT type is based on a 125 us recursive frame divided into 32 equal time slots. Each time slot permits transmission of 8 binary digits or bits. The first time slot of each frame is used for frame synchronization. The 17th time slot is used for the signalling channel. The other 30 time slots correspond to 30 speech channels. In the case of channel to channel signalling, the 17th time slots of 16 consecutive frames forming a multiframe permit transmission of the 30 speech channel line signalling. Out of the 16 8-bit combinations supplied by these 17th time slots of the multiframe, the first is used for multiframe synchronization, the other 15 each carry line signalling of two distinct speech channels and thus permit transmission of 4 bits per speech channel.

In a time division switching center in which this type of highway arrives, line signalling can be collected and injected at the center inputs by a line signaller controller serving as interface equipment between the PCM highways and the switching center central control unit. Register signalling, however, calls for a multiregister. At the call setting up stage, a speech channel is connected through the center to an access of a multiregister which receives and sends the voice frequency signals (in PCM form) of the register signalling and will therefore in this respect serve as interface equipment between the speech channel and the central unit.

U.S. Pat. No. 3,970,798 issued July 20, 1976 to G. Epenoy et al discloses a switching-processing node for use in a high speed data transmission system. The system separates the data from control signals upon receipt of a transmission. The data is then rejoined with the appropriate control signals. Other patents representative of the prior art are: U.S. Pat. Nos. 4,002,846; 3,997,728; 3,988,544; 3,984,642; 3,970,799; 3,952,162; 3,925,620 and 3,922,497.

SUMMARY OF THE INVENTION

A system in accordance with the principles of the invention provides for bidirectional transferring of line signalling information and register signalling information between a multiplex highway and a control unit. A line signalling controller serves as an interface between signalling channels of the multiplex highway and the control unit when register signalling information is not being exchanged. When register signalling information is to be exchanged, a multiregister serves as an interface between the multiplex highway and the control unit for register signalling information and as an interface between the line signalling controller and the control unit for line signalling information.

Thus, the control unit is interfaced to the multiplex highway via the multiregister for concurrent line and register signalling and is interfaced to the multiplex highway via a line signalling controller for transfers of line signalling information alone.

In an embodiment of the invention, the line signalling controller includes a signalling memory and a marking memory each including one cell per speech channel of the multiplex highway. The line signalling memory stores line signalling information for each channel whereas the marking memory stores information from the central unit that identifies which speech channels are in the register signalling condition or phase.

When the content of a marking memory cell indicates that a corresponding speech channel is in the register signalling phase, a transfer circuit transfers line signalling information stored in a corresponding line signalling memory cell to the multiregister via the corresponding speech channel of the switching center side of the multiplex highway.

In an embodiment of the invention, the signalling channel carries several line signalling bits for each speech channel over a multiframe. Additional means are provided for successive transfer of the several line signalling bits. The additional means are arranged to form multibit line signalling transfer messages, i.e., having as many bits as the multiframe has frames. This message contains the said line signalling bits as well as the format bits facilitating identification.

DESCRIPTION OF THE DRAWINGS

The invention may be better understood from a reading of the following detailed description in conjunction with the drawings in which.

DETAILED DESCRIPTION OF THE DRAWINGS

Figure 1:
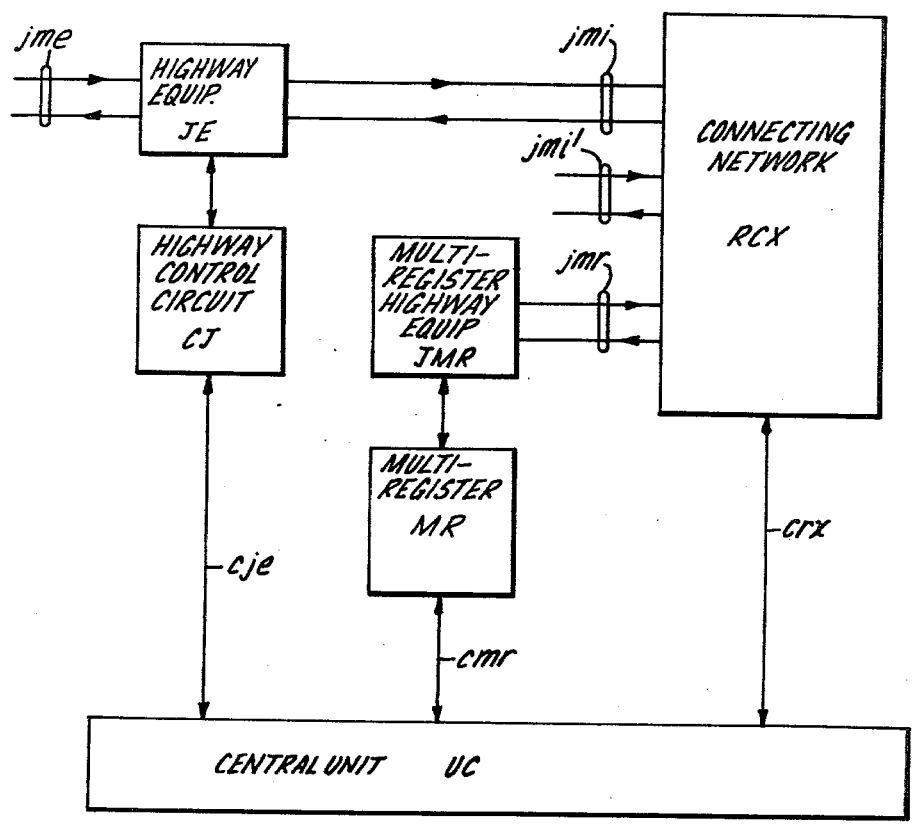
FIG. 1 illustrates in block diagram a time division switching center in which the present invention can be applied.

The block diagram of FIG. 1 illustrates a time division switching center in which the present invention can be applied.

PCM highways are connected to this center and the center sets up calls between the time division channels carried by these PCM highways. Each highway jme comprises a digital transmission channel for each transmission direction. It is connected in the switching center to an individual highway equipment JE which provides synchronization so that, at the level of equipment JE, two transmission channels, incoming and outgoing, appear as synchronized on a local reference frame.

The highway equipment is connected to a highway control circuit CJ itself connected by a link cje to a central unit UC. The central unit UC is a stored program digital processor and controls directly or indirectly all the operations performed in the switching center, whether they concern setting up, holding, releasing of calls, signalling exchanges or all accessory functions. The circuit CJ may be considered to be a peripheral sub-unit of central unit UC serving to give the central unit access to the PCM highways.

Circuit CJ comprises means for receiving from the equipment JE the incoming line signalling information coming from highway jme, means for storing this information and means for transmitting it to the central unit UC. It also comprises means for receiving from the central unit UC line signalling information to transmit, means for storing this information and means for retransmitting it on the outgoing channel of highway jme. With regard to line signalling, circuit CJ therefore plays the role of a line signalling controller and interface equipment between the external highway jme and the central unit UC.

The equipment JE is connected by an internal highway jmi to the connecting network RCX. Other internal highways (jmi, jmr) are connected to the network RCX. Network RCX is controlled by the central unit UC through link crx and, according to the orders it receives from the central unit UC, it sets up twoway connections between the time division channels of these different highways.

The switching center of FIG. 1 also comprises at least a multiregister highway equipment JMR coupled to network RCX by the twoway internal highway jmr. This equipment plays approximately the same role as the equipment JE, although in a simplified form, since it has no access to an external highway. It is connected to a multiregister MR, itself connected to the central unit UC by a link cmr.

The essential function of multiregister MR is register signalling exchange. A time division channel of a highway such as jme, when it is seized for setting up a call, which gives rise to an exchange of signals in the framework of line signalling, is connected to a time division channel of junction jmr. Equipment JMR permits multiregister MR to have access to this channel for sending and receiving the register signalling. In these register signalling operations, multiregister MR plays a role of interface between the central unit UC and each of the time division channels of highway jmr.

Register signalling is usually done by transmission of voice frequency signals on the speech channel. On the twoway time division channel of highway jmr, these signals are transmitted as PCM samples. Multiregister MR therefore has the function, for each of the channels of highway jmr, of generating and transmitting these PCM samples and of recognizing the voice frequency signals to which they correspond, in order to specify their reception to the central unit UC.

During this time, line signalling is continued.

When register signalling exchanges concerning a time division channel of an external highway are terminated, this time division channel is disconnected from the time division channel of highway jmr to which it was connected, therefore from multiregister MR, it can then be connected to a time division channel of another external highway (or the same one) for setting up a call. The call will no longer be controlled except by signal exchanges made in the framework of line signalling.

The central unit UC exchanges therefore line signalling with external highways by means of highway control circuits (CJ) and register signalling through multiregister(s) (MR). As shown previously, it is desirable that at all times the central unit has only one signalling exchange path for each call channel.

Means is provided for use when a time division channel of an external highway is connected to an access of a multiregister in order to send the line signalling of this time division channel of the multiplex highway to the multiplex highway to the multiregister and reciprocally. Thus, the multiregister will be the only interface between the central unit and the time division channel as long as this is in register phase.

Figure 2:
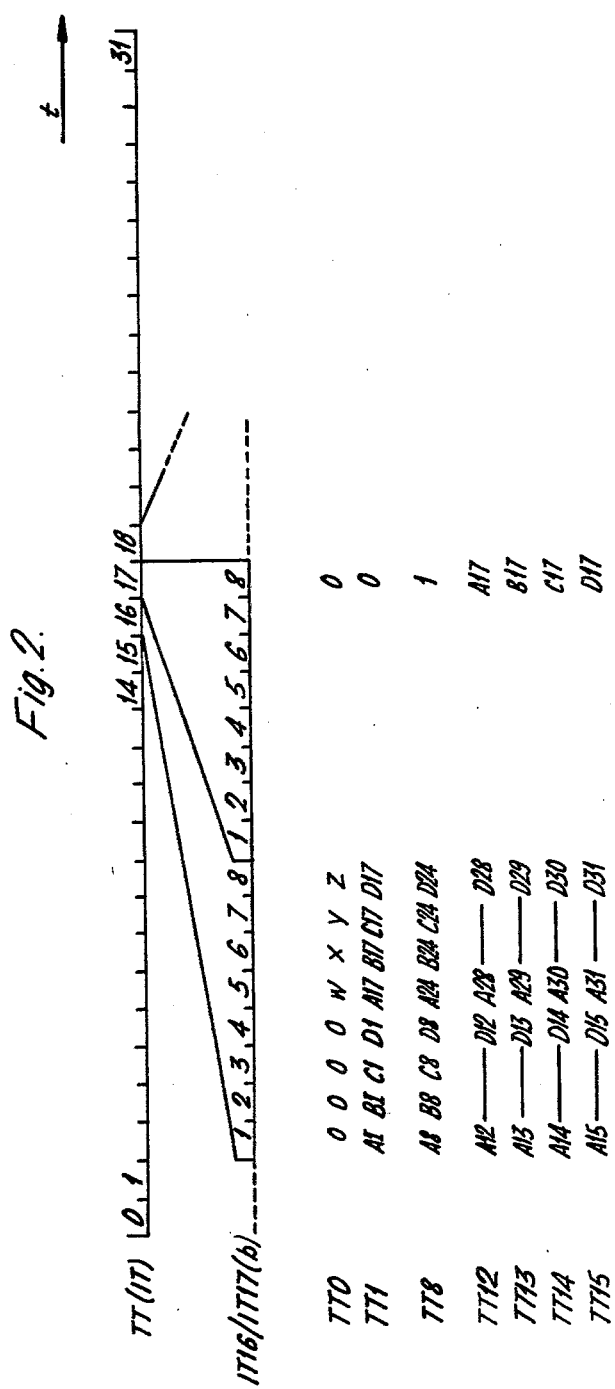
FIG. 2 is a diagram showing the principle of the line signalling transfer system.

Reference will now be made to FIG. 2 in order to describe the principle of signalling information transfer on which the present invention is based.

The upper line TT of FIG. 2 shows the slicing of time t in order to constitute a time division frame of 32 time slots of equal lengths called IT0 to IT31. The frame time is 125 us and that of each time slot is 3.9 us. In the case of the CEPT type PCM highway, time slot IT0 is reserved for frame synchronization. Time slot IT16 is used for signalling information transmission. The other 30 time slots are each used as a speech channel medium.

The line designated IT16/IT17 illustrates the time slots IT16 and IT17 on an expanded scale to show the time slicing t in each time slot whereby 8-bits called b1 to b8 are transmitted.

Lines TT0 to TT15 show the information transmitted in time slots IT16 and IT17 during 16 successive frames which form a multiframe. Time slot IT16 is reserved for line signalling which will be considered first of all. In the case of channel by channel signalling to which the present invention applies, time slot IT16 successively carries, in frame TT0, a synchronizing combination "0000wxyz" then, in frames TT0 to TT15, the line signalling information of the 30 speech channels, at the rate of two groups of 4 bits corresponding to two channels of ranks i and i+16 per IT16, i being the number of the frame in the multiframe. The four signalling bits of each channel are designated by the letters A, B, C, D followed by the number of the speech channel to which they are assigned.

By referring to FIG. 1, the control circuit CJ, in the signalling reception function, should sample in equipment JE the information supplied during time slot IT16, identify the framing combination "0000wxyz", then store in a 30 cell signalling memory the 30 groups of 4 bits that follow the synchronizing combination. The line signalling information will thus be kept at the disposal of the central unit UC which can request it only once per multiframe, i.e, once every 2 ms.

The principle of the invention consists in providing means for transferring signalling information of the channels in register phase in the direction of the multiregister by one of the bit slots of the speech channel. As an example, the speech channel carried by time slot IT17 will be considered. The transfer will be made by bit b8 of time slot IT17. As shown by lines TT0 and TT15 of FIG. 2, 16 bits can thus be transferred during time slot IT17 of the 16 frames of the signalling multiframe. If the signalling channel supplies only one bit per multiframe, this bit can be transferred in a repetitive way, 16 times per multiframe by bit b8 of time slot IT17. Since it supplies several bits, a cyclic transfer of the bits received (A, B, C, D, A, B, etc. . . . ) can be foreseen. In preference, the invention proposes transfer of a 16-bit message comprising format bits, others which are available for other purposes and the four signalling bits received in the multiframe.

In FIG. 2, this message is shown under the slot corresponding to bit b8 of IT17. It comprises 0's, in frame TT0, TT1 etc. . . . , 1's in frames TT8, etc. . . . and the four signalling bits A17, B17, C17, D17 of the channel carried by IT17, as they have been received in IT16 of frame TT1 and stored in the signalling memory; they are transferred in frames TT12 to TT15.

Multiregister MR will receive this message, identify its various parts and especially bits A17 to D17 that it can store in a cell of a signalling memory in order to place them at the disposal of the central unit UC.

If now signalling transmission is considered instead of signalling reception, the invention principle still applies, by similar means, the direction of transmission being reversed. The central unit will supply to the multiregister the four bits to be transmitted. This multiregister will compose and transmit a 16-bit message by bit b8 of the speech channel, in the outgoing direction. They will arrive in equipment JE in IT17; there they will be sampled by transfer means which will write in the four line signalling bits in the signalling memory cell assinged to this IT17 for them to be sent onto junction jmr during IT16 of frame TT1.

The transfer of the line signalling on bit b8 of the speech channel will not hinder register signalling. Indeed this bit b8 is the least significant bit of the combination transmitted by each IT. Now, the register signalling gives rise to narrow band voice frequency signal transmission, whose samples can, with no great loss of performance, be represented by combinations coded at only 7 bits per 8 bit coding and with abandon of the least significant bit. Thus, in register phase the multiregister will simultaneously carry out register signalling exchanges on bits b1 to b7 of the speech channel and line signalling exchanges on bit b8 in the way that has been briefly described.

Figure 3:
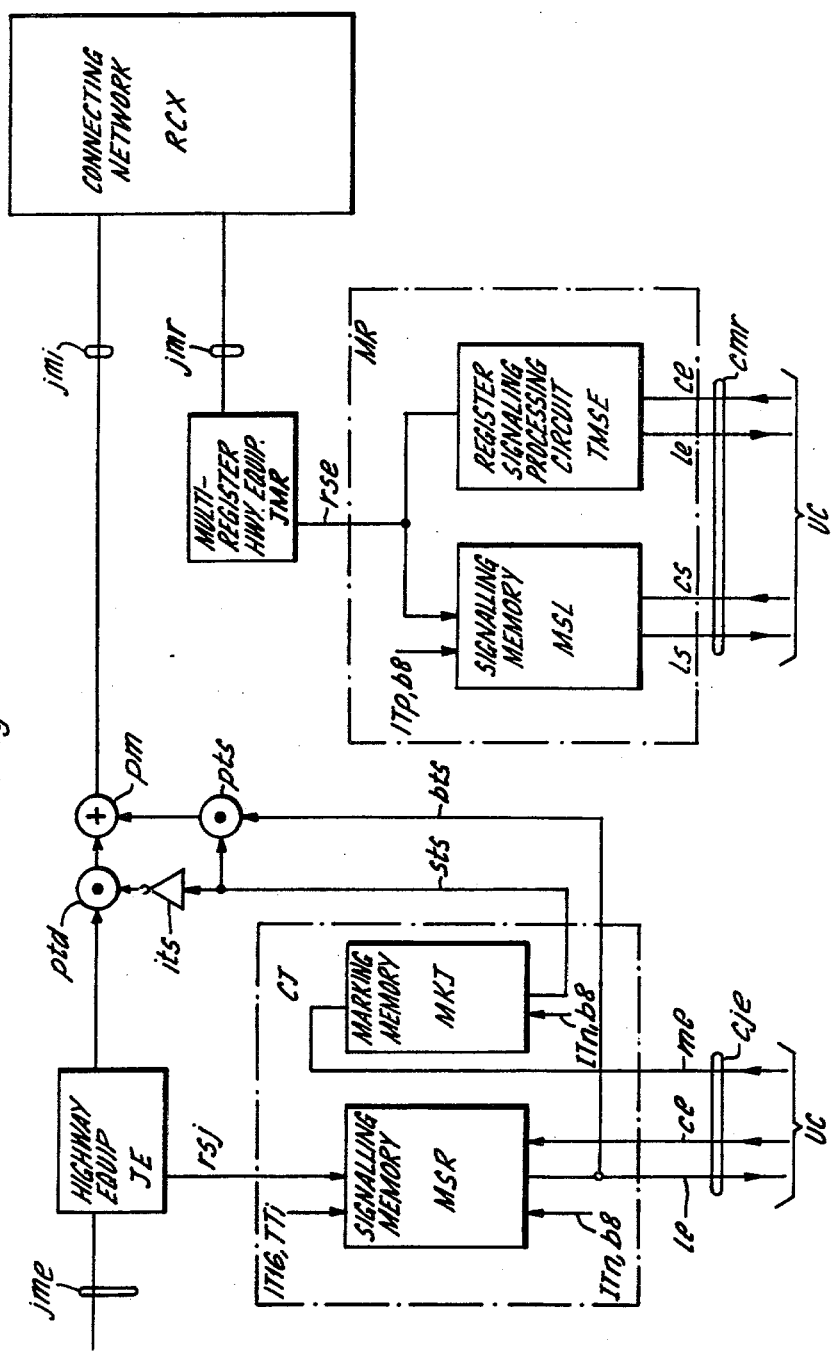
FIG. 3 is a diagram of an example of simplified embodiment of a system in accordance with the invention.

By referring to FIG. 3, a description will now be given of a form of embodiment of the essential means provided for implementing this line signalling transfer according to the invention. The diagram of FIG. 3 shows only the means used in the receiving direction. Similar means are provided in the transmission direction.

Highways jme, jmi, jmr, equipments JE, JRM, circuit CJ, network RCX and multiregister MR of FIG. 1 are seen on FIG. 3.

In circuit CJ, a signalling memory MSR and a marking memory MKJ are shown. Memory MSR has at least one cell per speech channel of highway jme. Each cell is provided for recording signalling information received from highway jme and assigned to a specific speech channel. This information reaches the highway by link rsj and is recorded due to an order referenced time slot IT16, TTi. This order, coming from a clock which is not shown, like all the other orders of the same type relating to time division slicing, specifies that the information supplied on link rsj during time slot IT16 should be recorded in two addresses derived from row TTi of the frame in the multiframe. It will indeed be remembered that time slot IT16 of frame TTi supplies signalling information from two speech channels carried in time slots ITi and Iti+16. The control circuits of memory MSR will therefore be arranged in order to write in successively the first four bits of time slot IT16 in address cell i, then the next four bits in address cell i+16.

The signalling information stored in this way is available for the central unit which can read it by link cje by sending an appropriate order by line c1 (address, reading order) and receive the information read by line 11.

In addition, memory MSR is read at each time slot IT due to an order ITn, b8 supplied during bit b8 of the time slot IT, the address being the time slot number ITn of the time slot IT in the frame. The signalling information read is supplied on the conductor bts.

Memory MKJ possesses one cell per speech channel of highway jme. Each cell contains at least one bit written in by central unit UC by line ml of link cje (address, writing order and information to be written). Normally, this bit has the value 0. But the central unit UC writes a 1 when the speech channel is connected to the multiregister MR. It writes an 0 again when the speech channel is disconnected from the multiregister. Memory MKJ is read at each time slot IT, due to order ITn, b8, at the same time as memory MSR. The marking bit obtained in this way is transmitted on conductor sts. It has value 1 only for speech channels in register phase and during the time slot reserved for bit b8.

Normally, conductor sts is at level 0. AND gate pts is inhibited. NOT circuit its supplies a signal which unblocks gate ptd. The output on the exchange side of equipment JE is therefore connected by AND gate ptd and OR gate pm, to the receiving channel of the internal highway jmi and to network RCX. Thus, for any channel which is not in register phase, the signalling transfer means have no effect, as the output of equipment JE remains connected to the internal highway jmi and to network RCX.

However, for a speech channel in register phase, during the ITn carrying this channel, but only during the period reserved for bit b8 of this IT, conductor sts is set to level 1. Then, by NOT circuit its, gate ptd is blocked, while gate pts is unblocked. The signalling information coming from memory MSR and present at this moment on conductor bts is thus transmitted by gates pts and pm on highway jmi. It takes the place of bit b8 of the combination supplied in time slot ITn by equipment JE, coming from highway jme, this in application of the previously described principle.

In multiregister MR, a signalling memory MSL and a register signalling processing circuit TMSE are shown. The latter itself does not form part of the invention and will not be described. With respect to it, only links le and ce have been mentioned by which central unit UC obtains knowledge of the signals received within the framework of the register signalling. Memory MSL possesses just like memory MSR one cell per time division channel, but it is a question of time division channels of highway jmr. The time division channels connected to the multiregister MR are all due to this sole fact in register phase and the transfer of line signalling is in operation; there is therefore no need for a marking memory.

During the period corresponding to bit b8 of each time slot IT of highway jm⁻, an order ITp, b8 (address, writing order) causes recording of the line signalling information transferred as described above, and appearing on conductor rse in the appropriate memory cell.

Central unit UC obtains knowledge of this information, by lines ls and cs, just in memory MSL. This information can be added to that supplied, for the same time division channel, by circuit TMSE. In addition, since multiregister MR has at the same time at its disposal line and register signals, it can combine them itself in order to present them to the UC in an integrated way, or even carry out certain processing or signalling operations, autonomously, without using the central unit. This forms part of the advantages provided by the invention.

The example of embodiment of the invention that has just been described by referring to FIG. 3 permits therefore, in the external highway-multiregister direction, transferring the line signalling in register phase by simple means since they comprise only a memory with one bit per time division memory and some gates at the level of the PCM highway and a line signalling store in the multiregister. It has been noted that the signalling transfer between memories MSR and MSL is performed at the rate of one bit per frame with no other details. This can suffice if the line signalling recorded in memory MSR only comprises one bit per multiframe. This bit is then transferred 16 times in this way which is redundant but costs nothing. It would also be quite possible to transfer in this way two bits in alternation, by providing a frame by frame alternate circuit at the output of memory MSR and input of memory MSL and even to do a time division multiplexing of the four line signalling bits of the CEPT, for instance.

The invention proposes however to preferably make this transfer of several bits of line signalling per speech channel in a message made up for instance according to the format described in relation to FIG. 2, i.e, by a 16-bit message transmitted in a 16 frame multiframe, at the rate of one bit per frame as bit b8 of each time slot IT assigned to the speech channel in question. The means required for this purpose are described, as an example, by FIG. 4 which shows only the supplementary means added in circuit CJ of FIG. 3 and by FIG. 5 which shows only the supplementary means to be added to multiregister MR of FIG. 3.

Figure 4:
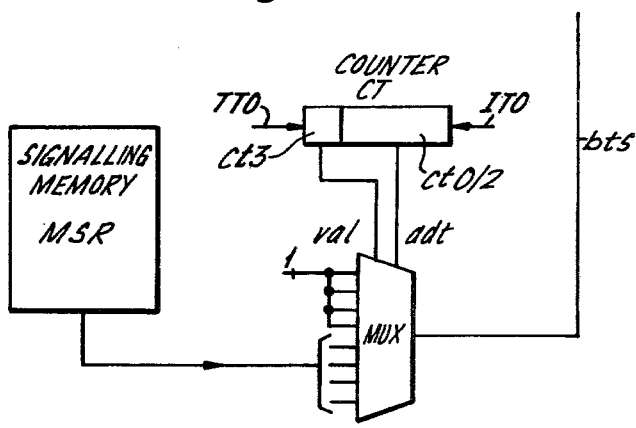
FIG. 4 is a schematic diagram of modifications to circuit CJ of FIG. 3 for 16-bit message line signalling transfer.

In circuit CJ, as can be seen on FIG. 4, these means comprise only a counter CT and a multiplexer MUX. Counter CT, cleared by a signal TT0 a the beginning of the multiframe, then increments at each IT0. It has four stages ct 0/2 and ct 3 and counts the 16 frames of the multiframe. Multiplexer MUX is a circuit which connects one of its inputs located on the left to its sole output located on the right according to address adt which it receives from stages ct0/2 of counter CT and providing it also receives an enabling signal va1 from stage ct3 of counter CT.

In this case, signalling memory MSR (FIG. 3) has four outputs and supplies to bit b8 of each IT, the four signalling bits received for the benefit of the channel carried by this IT. The multiplexer MUX inserts itself between these four outputs and conductor bts serving for the line signalling transfer (see again FIG. 3). The operation corresponds to the message already described with respect to FIG. 2:

0000 0000 1111 ABCD

This format is determined by counter CT. During the first eight frames of the multiframe, stage ct3 of counter CT remains in position 0. Multiplexer MUX is not enabled. Conductor bts remains at level 0. For any channel in register phase, the transferred signalling bit is 0. Signalling messages thus start by 8 bits 0. Then, stage ct3 passes in position 1 and enables the multiplexer which then connects, frame by frame, conductor bts first of all to the four inputs connected to level 1, then to the four inputs connected in sequence to the outputs supplying signalling bits A, B, C, D of memory MSR. Due to this, for any signalling channel in register phase, the transferred signalling message continues by four 1's, then by signalling bits A, B, C, D.

Figure 5:
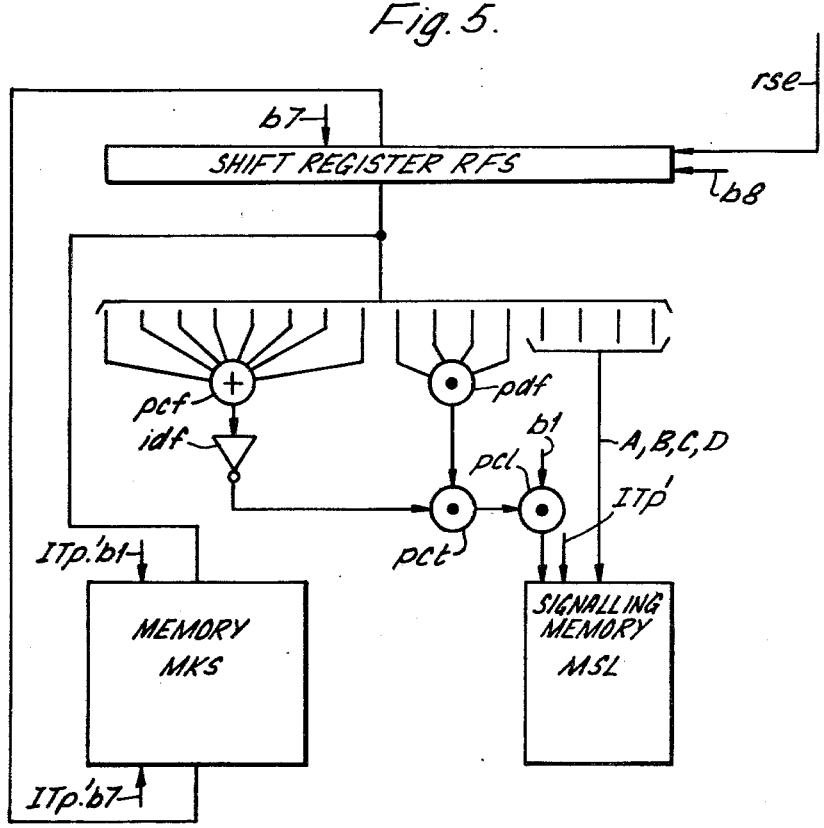
FIG. 5 is a schematic diagram of modifications to multiregister MR of FIG. 3 for receiving messages formed by the arrangements of FIG. 4.

In the multiregister MR, the additional means provided, according to the example of FIG. 5, comprise a memory MKS recording a 16 bit word per time division channel, a shift register RFS and some gates. For each time division channel, memory MKS is read by the order of a signal ITp,b7 (address, reading order) and the information read is written in register RFS by order b7. During the period corresponding to bit b8 which immediately follows this reading, signal b8 orders input of the bit present on conductor rse (see FIG. 3) in register RFS, by shifting one step to the left. Then, by the order of signal ITp,b7 (same address as the reading temporarily saved by means not shown, writing order) the contents of register RFS are recorded in the previously read location. These means permit updating, in register RFS, for each time division channel of highway jmr, at the moment when the bit 8 carrying the line signalling reaches multiregister MR, a state of the last 16 signalling bits received. Once, every 16 frames, register RFS contains, for a given channel, a complete signalling transfer message. The control gate pcf, of the OR type receiving 8 bits 0 supplies a level 0 and NOT circuit idf which follows a level 1. Gate pct of AND type supplies a level 1 which unblocks a gate pc1 controlling the transmission of signal b1 (bit b1 of the next time division channel) serving for a writing order in memory MSL. The address is ITp+, that of the time division channel whose IT has just ended. The information to be written in is supplied by the four righthand stages of register RFS and is formed of the four signalling bits A, B, C. D.

Thus, the line signalling information transferred, as has been described, is written in memory MSL at the disposal of the central unit UC, or for the purpose of any processing in multiregister MR as was previously shown with respect to FIG. 3.

The transfer of line signalling in the other transmission direction calls for similar means, those of FIG. 4 coming to complete multiregister MR (FIG. 3) with respect to an outgoing signalling memory similar to MSL, in which the signals to be transmitted are prepared and those of FIG. 5 coming to complete control circuit CJ, with respect to a line signalling sending memory similar to MSR, in which the signalling bits to be transmitted on the external highway jme will be written.

It is quite obvious that the preceding descriptions are given only by way of unrestrictive example and that numerous alternatives can be foreseen without departing from the scope of the invention. To mention only a few, the operational mode of the memories will, in practice, depend on the technology chosen. It will be the same as far as the switching operations are concerned, i.e., types of gates and logic levels. The compromise between the memory and logic means can be modified for performing certain functions, thus the arrangement of FIG. 5 which requires a 16-bit time division channel memory, but few logic circuits, could be replaced by a smaller memory recording a time division channel message receiving sequential, at the cost of more sophisticated logic circuits responsible for advancing this sequential according to the signals received. All the data, codes and formats given can finally vary according to the application.

What is claimed is:

1. A signal transfer system for a time division switching system comprising:
   at least one multiplex highway carrying a signaling channel and speech channels;
   a network means for selectively connecting said speech channels to one another;
   multiregister means connectable to said speech channels for receiving register signaling information therefrom;
   a central processor having access to said network and to said multiregister means;
   a line signaling controller including:
   (a) a signaling memory comprising: a first plurality of memory cells;
   (b) a marking memory comprising: a second plurality of memory cells;
   (c) means for storing in each signaling memory cell line signaling information for a corresponding speech channel;
   (d) means for storing in each marking memory cell an information bit for a corresponding speech channel, each said information bit being supplied by said central processor and having a predetermined value when said corresponding speech channel may contain register signaling information;
   (e) means for reading each of said pluralities of signaling memory and marking memory cells corresponding to a speech channel during a predetermined bit time slot of said corresponding speech channel;
   (f) switching means for transmitting over said multiplex highway line signaling information stored in a signaling memory cell in response to the information bit stored in a corresponding marking memory cell having said predetermined value; and
   selection means for selecting a signaling bit in information transmitted in a corresponding speech channel and for transmitting said line signaling bit to said multiregister means concurrently with register signaling information for said corresponding channel.

2. A signal transfer system according to claim 1, further comprising means for transmission of line signaling information stored in said multiregister means.

3. A signal transfer system according to claim 1, further comprising frame counting means connected between the output of the said signaling memory and said switching means for permitting successive transfer of several signaling bits in several successive frames according to the state of said frame counting means.

4. A signal transfer system according to claim 3, wherein said frame counting means comprises a counter having a plurality of states corresponding to the number of frames in a multiframe of said multiplex highway.

5. A signal transfer system according to claim 4, wherein said selection means is adapted for selecting and transferring signaling bits read from the signaling memory and additional bits having predetermined values to form a signaling message.

6. A signal transfer system according to claim 3, 4 or 5 comprising means for transmitting line signaling from said multiregister means.

7. A signal transfer system according to claim 3, 4 or 5, wherein said bit time slot during which the line signaling transfer is made is that of the least significant bit in the speech channel time slot.

* * * * *